US012720492B2

(12) United States Patent
Fan

(10) Patent No.: US 12,720,492 B2
(45) Date of Patent: Aug. 25, 2026

(54) METHOD FOR WIRELESS COMMUNICATION, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 406 days.

(21) Appl. No.: 18/452,339

(22) Filed: Aug. 18, 2023

(65) Prior Publication Data

US 2023/0397165 A1 Dec. 7, 2023

Related U.S. Application Data

(63) Continuation of application No. PCT/CN2021/077921, filed on Feb. 25, 2021.

(51) Int. Cl.
*H04W 68/02* (2009.01)
*H04W 48/16* (2009.01)
*H04W 72/0453* (2023.01)

(52) U.S. Cl.
CPC .......... *H04W 68/02* (2013.01); *H04W 48/16* (2013.01); *H04W 72/0453* (2013.01)

(58) Field of Classification Search
CPC ........................ H04W 52/0229; H04L 5/0053
See application file for complete search history.

(56) References Cited

U.S. PATENT DOCUMENTS

2009/0215472 A1* 8/2009 Hsu ...................... H04W 8/183 455/458
2019/0268874 A1 8/2019 Ravishankar et al.
2020/0022105 A1* 1/2020 Fu .................... H04W 52/0229
2020/0229095 A1 7/2020 Shrestha et al.
2023/0066040 A1* 3/2023 Xue ................... H04W 52/028
2023/0078444 A1* 3/2023 Maleki ................. H04L 5/0094 370/311
2023/0088580 A1* 3/2023 Priyanto .............. H04L 5/0051

FOREIGN PATENT DOCUMENTS

CN 111565067 8/2020
CN 111885710 11/2020
EP 3780765 2/2021

OTHER PUBLICATIONS

Samsung, “On potential paging enhancements,” 3GPP TSG RAN WG1 #102, R1-2006159, Aug. 2020.
LG Electronics, “Paging procedure for CBS based Group message delivery,” SA WG2 Meeting S2#104, S2-142396, Jul. 2014.

(Continued)

*Primary Examiner* — Fabricio R Murillo Garcia
(74) *Attorney, Agent, or Firm* — Hodgson Russ LLP

(57) ABSTRACT

Methods for wireless communication, a terminal device, and a network device are provided. The method for wireless communication includes the following. A terminal device receives first configuration information, where the first configuration information is used for the terminal device to determine a time-frequency-domain location of a target paging occasion (PO).

20 Claims, 9 Drawing Sheets

(56) References Cited

OTHER PUBLICATIONS

EPO, Extended European Search Report for EP Application No. 21927207.7, Mar. 19, 2024.
"3rd Generation Partnership Project; Technical Specification Group Radio Access Network; NR; Radio Resource Control (RRC) protocol specification (Release 16)," 3GPP TS 38.331, Jan. 2021, v16.3.1.
"3rd Generation Partnership Project; Technical Specification Group Radio Access Network; NR; User Equipment (UE) procedures in Idle mode and RRC Inactive state (Release 16)," 3GPP TS 38.304, Dec. 2020, v16.3.0.
Mediatek Inc., "Paging Enhancements for UE Power Saving in NR," 3GPP TSG-RAN WG2 Meeting #112-e, R2-2009785, Nov. 2020.
WIPO, International Search Report and Written Opinion for International Application No. PCT/CN2021/077921, Nov. 17, 2021.

* cited by examiner

METHOD FOR WIRELESS COMMUNICATION, TERMINAL DEVICE, AND NETWORK DEVICE

CROSS-REFERENCE TO RELATED APPLICATION(S)

This application is a continuation of International Application No. PCT/CN2021/077921, filed Feb. 25, 2021, the entire disclosure of which is incorporated herein by reference.

TECHNICAL FIELD

This disclosure relates to the field of communication, and more particularly to methods for wireless communication, a terminal device, and a network device.

BACKGROUND

The 5th-generation new radio (5G NR) system defines deployment scenarios of a non-terrestrial network (NTN) system including a satellite network. The NTN system can achieve continuity of 5G NR services with the aid of wide-area coverage capabilities of satellites. A satellite cell has a coverage far larger (usually hundreds of thousands of times larger) than a coverage of a terrestrial cell. Generally speaking, a larger coverage of a cell means that the number of terminal devices served by the cell increases proportionally, but resources for paging terminal devices in the satellite cell are not increased compared with the terrestrial cell, and a proportion of the number of terminal devices that can actually be paged by a satellite system to the total number of terminal devices covered by the satellite cell is far less than a proportion of the number of terminal devices that can actually be paged by the terrestrial cell to the total number of terminal devices covered by the terrestrial cell. As a result, in the satellite cell, a large number of terminal devices may not be paged, or congestion of paging resources may occur, which may seriously adversely affect paging experience of the NTN system.

SUMMARY

Methods for wireless communication, a terminal device, and a network device are provided in implementations of the disclosure.

In a first aspect, a method for wireless communication is provided. The method includes the following. A terminal device receives first configuration information, where the first configuration information is used for the terminal device to determine a time-frequency-domain location of a target paging occasion (PO).

In a second aspect, a method for wireless communication is provided. The method includes the following. A network device transmits first configuration information to a terminal device, where the first configuration information is used for the terminal device to determine a time-frequency-domain location of a target PO.

In a third aspect, a terminal device is provided. The terminal device includes a transceiver, a processor coupled with the transceiver, and a memory storing a computer program which, when executed by the processor, causes the transceiver to receives first configuration information, where the first configuration information is used for the terminal device to determine a time-frequency-domain location of a target PO.

In a fourth aspect, a network device is provided. The network device includes a transceiver, a processor coupled with the transceiver, and a memory storing a computer program which, when executed by the processor, causes the transceiver to transmit first configuration information to a terminal device, where the first configuration information is used for the terminal device to determine a time-frequency-domain location of a target PO.

Other features and aspects of the disclosed features will become apparent from the following detailed description, taken in conjunction with the accompanying drawings, which illustrate, by way of example, the features in accordance with implementations the disclosure. The summary is not intended to limit the scope of any implementations described herein.

DETAILED DESCRIPTION

Figure 1:
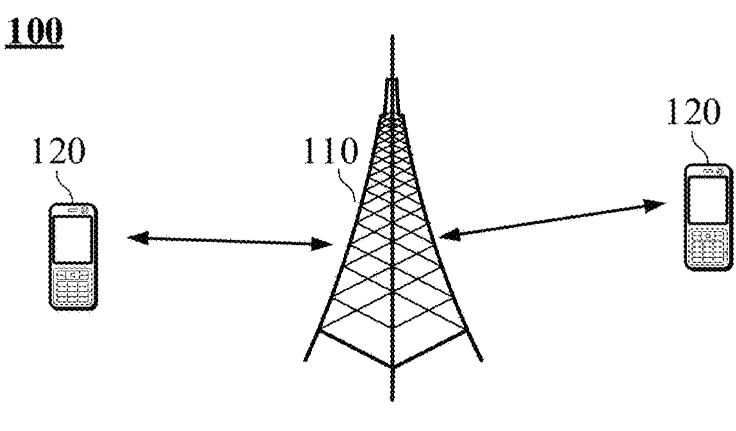
FIG. 1 is a schematic diagram illustrating a communication system architecture applicable to implementations of the disclosure.

The following will illustrate clearly and completely technical solutions of implementations of the disclosure with reference to accompanying drawings of implementations of the disclosure. Apparently, implementations illustrated herein are some, rather than all implementations, of the disclosure. Based on the implementations of the disclosure, all other implementations obtained by those of ordinary skill in the art without creative effort shall fall within the protection scope of the disclosure.

Technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a 5th-Generation (5G) communication system, or other communication systems.

Generally speaking, a conventional communication system supports a limited number of connections and therefore is easy to implement. However, with development of communication technology, a mobile communication system not only supports conventional communication but also supports, for example, device to device (D2D) communication, machine to machine (M2M) communication, machine type communication (MTC), and vehicle to vehicle (V2V) communication. Implementations herein can also be applicable to these communication systems.

In some implementations, a communication system in implementations of the disclosure can be applicable to a carrier aggregation (CA) scenario, a dual connectivity (DC) scenario, and a standalone (SA) scenario.

In some implementations, the communication system in implementations of the disclosure can be applicable to an unlicensed spectrum, where the unlicensed spectrum can also be regarded as a shared spectrum. Alternatively, the communication system in implementations of the disclosure can also be applicable to a licensed spectrum, where the licensed spectrum can also be regarded as an unshared spectrum.

In implementations of the disclosure, each implementation is illustrated in conjunction with a network device and a terminal device, where the terminal device may also be called a user equipment (UE), an access terminal, a subscriber unit, a subscriber station, a mobile station, a mobile platform, a remote station, a remote terminal, a mobile device, a user terminal, a terminal, a wireless communication device, a user agent, a user apparatus, etc.

The terminal device may also be a station (ST) in the WLAN, a cellular radio telephone, a cordless telephone, a session initiation protocol (SIP) telephone, a wireless local loop (WLL) station, a personal digital assistant (PDA). The terminal device may also be a device with wireless communication functions such as a handheld device, a computing device, other processing devices coupled with a wireless modem, an in-vehicle device, a wearable device, or a terminal device in a next-generation communication system such as an NR network, a terminal device in a future evolved common land mobile network (PLMN), etc.

In implementations of the disclosure, the terminal device can be deployed on land, including indoor or outdoor, handheld, wearable, or vehicle-mounted; on water (e.g., a ship); and also in the air (e.g., an aircraft, a balloon, and a satellite).

In implementations of the disclosure, the terminal device may be a mobile phone, a pad, a computer with wireless transceiving functions, a terminal device for virtual reality (VR), a terminal device for augmented reality (AR), a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, etc.

As an example but not limitation, in implementations of the disclosure, the terminal device may also be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets and smart jewelry for physical sign monitoring or the like.

In implementations of the disclosure, the network device may be a device that is used to communicate with a mobile device. The network device may be an access point (AP) in the WLAN, a base transceiver station (BTS) in the GSM or CDMA system, a NodeB (NB) in the WCDMA system, or an evolved NodeB (eNB or eNodeB), a relay station, an AP, an in-vehicle device, or a wearable device in the LTE system, a network device or a generation NodeB (gNB) in the NR network, a network device in the future evolved PLMN, or a network device in the NTN network.

As an example but not limitation, in implementations of the disclosure, the network device may have a mobility, e.g., the network device may be a mobile device. Optionally, the network device may be a satellite or a balloon station. In some implementations, the satellite may be a low earth orbit (LEO) satellite, a medium earth orbit (MEO) satellite, a geostationary earth orbit (GEO) satellite, a high elliptical orbit (HEO) satellite, or the like. In some implementations, the network device may also be a base station deployed on land, on water, or on other locations.

In implementations of the disclosure, the network device can provide a service for a cell, and the terminal device can communicate with the network device through transmission resources (e.g., frequency-domain resources or spectrum resources) for the cell, where the cell may be a cell corresponding to the network device (e.g., a base station). The cell may belong to a macro base station or a base station corresponding to a small cell, where the small cell may include a metro cell, a micro cell, a pico cell, a femto cell, or the like. These small cells have features of small coverage and low transmission power and are suitable for providing high-speed data transmission services.

Exemplarily, a communication system 100 in implementations of the disclosure is illustrated in FIG. 1. The communication system 100 may include a network device 110, where the network device 110 can communicate with terminal devices 120 (or called communication terminals or terminals). The network device 110 can provide communication coverage for a specific geographical area and can communicate with terminal devices in the coverage.

FIG. 1 exemplarily illustrates a network device and two terminal devices. In some implementations, the communication system 100 may include multiple network devices, and the other number of terminal devices may be included in a coverage of each of the multiple network devices, which will not be limited in implementations of the disclosure.

In some implementations, the communication system 100 may further include a network controller, a mobility management entity (MME), or other network entities, which will not be limited in implementations of the disclosure.

It can be understood that, a device with a communication function in a network/system in implementations of the disclosure can be called a communication device. Taking the communication system 100 illustrated in FIG. 1 as an example, communication devices may include the network device 110 and the terminal device 120 that have communication functions, and the network device 110 and the terminal device 120 may be the above-mentioned devices, which will not be repeated herein. The communication devices may further include other devices in the communication system 100, e.g., a network controller, an MME, or other network entities, which will not be limited in implementations of the disclosure.

It can be understood that, the terms “system” and “network” in this disclosure are often used interchangeably. The term “and/or” in this disclosure is simply an illustration of an association relationship of associated objects, indicating that three relationships may exist, for example, A and/or B, which may indicate the existence of A alone, A and B together, and B alone. In addition, the character “/” in this disclosure generally indicates that associated objects are in an “or” relationship.

The terms used in implementations of the disclosure are only for the purpose of explaining specific implementations of the disclosure rather than limiting the disclosure. The terms “first”, “second”, “third”, “fourth”, and the like used in the specification, the claims, and the accompany drawings of the disclosure are used to distinguish different objects rather than describe a particular order. In addition, the terms “include”, “comprise”, and “have” as well as variations thereof are intended to cover non-exclusive inclusion.

It can be understood that, the “indication” referred to in implementations of the disclosure may be a direct indication, an indirect indication, or an indication indicating an associated relation. For example, A indicates B, which can mean that A indicates B directly, e.g., B can be obtained through A, can also mean that A indicates B indirectly, e.g., A indicates C, and B can be obtained through C, or can further mean that A and B have an associated relation.

In illustration of implementations of the disclosure, the term “correspondence” may represent a direct correspondence or indirect correspondence between the two, may also represent an associated relation between the two, or may further represent a relation of indicating and being indicated, a relation of configuring and being configured, or other relations.

In implementations of the disclosure, “predefinition” may be implemented by pre-storing corresponding codes, tables, or other modes indicating relevant information in a device (for example, including a terminal device and a network device), and specific implementations are not limited in the disclosure. For example, predefinition may refer to definition in a protocol.

In implementations of the disclosure, “protocol” may refer to a standard protocol in the field of communication, and may include, for example, an LTE protocol, an NR protocol, and a related protocol applicable to a future communication system, which is not limited in the disclosure.

In a 5G network environment, a new radio resource control (RRC) state, namely an RRC_INACTIVE state, has been defined to reduce air interface signaling, achieve fast radio connection recovery, and achieve fast data service recovery. Such a state is different from an RRC_IDLE state and an RRC_CONNECTED state. In the RRC_IDLE state, mobility is based on cell reselection of a UE, paging is initiated by a core network (CN), and a paging area is configured by the CN. The base station side has no UE access stratum (AS) context and no RRC connection. In the RRC_CONNECTED state, there is an RRC connection, both the base station and a UE have a UE AS context, and a network device knows a location of the UE based on a cell level. Mobility is controlled by the network device. Unicast data can be transmitted between the UE and the base station. In the RRC_INACTIVE state, mobility is based on cell reselection of the UE, there is a CN-NR connection, a certain base station has a UE AS context, paging is triggered by a radio access network (RAN), an RAN-based paging area is managed by the RAN, and the network device knows the location of the UE based on a RAN-based paging area level.

To better understand implementations of the disclosure, a paging-control-channel search space involved in the disclosure is described.

The paging-control-channel search space is a search space corresponding to a physical downlink control channel (PDCCH) in which a paging-control-channel content is carried, and is hereinafter referred to as a paging search space. The paging search space mainly includes: an appearance period of the paging search space (i.e., a period every which a PDCCH for carrying the paging-control-channel content appears), an offset between a location where the paging search space actually appears and a start location of the appearance period of the paging search space, a duration of the paging search space in the appearance period of the paging search space, and symbols available for paging PDCCH search in 14 symbols in each slot in the duration of the paging search space.

To better understand implementations of the disclosure, an NR paging content involved in the disclosure is described.

The paging content includes a paging-control-channel content (i.e., a paging PDCCH content) and a paging message content (i.e., a paging physical downlink shared channel (PDSCH) content).

The paging-control-channel content may contain three parts, where the first part contains a 2-bits indication indicating existence or absence of contents of the remaining two parts, and reference can be made to table 1 for specific rules.

TABLE 1 meaning of a 2-bits indication in a paging control channel

| bit value | meaning of bit value |
|---|---|
| 00 | reserved |
| 01 | only paging scheduling information |
| 10 | only paging short message |
| 11 | both paging scheduling information and paging short message |

The second part contains paging scheduling information indicating a resource location where a paging message is located. The third part contains a paging short message. The message occupies 8 bits, where one bit indicates system information (SI) update, another bit indicates warn-information update, and the remaining 6 bits are temporarily reserved for future use.

The paging message content contains two parts. The first part includes a paging logging, where the paging logging is a list containing identities of terminal devices that need to be paged at a paging occasion (PO). The second part includes a 1-bit access category indication indicating whether a current paging message is from a non-the 3rd generation partnership project (Non-3GPP) system.

A satellite cell has a coverage far larger (usually hundreds of thousands of times larger) than a coverage of a terrestrial cell. Generally speaking, a larger coverage of a cell means that the number of terminal devices served by the cell increases proportionally, but resources for paging terminal devices in the satellite cell are not increased compared with the terrestrial cell, and a proportion of the number of terminal devices that can actually be paged by a satellite system to the total number of terminal devices covered by the satellite cell is far less than a proportion of the number of terminal devices that can actually be paged by the terrestrial cell to the total number of terminal devices covered by the terrestrial cell. As a result, in the satellite cell, a large number of terminal devices may not be paged, or congestion of paging resources may occur. For a communication system, such a situation is unacceptable.

Based on the above problem, solutions for determining a PO are proposed in the disclosure, which can solve shortage or even congestion of paging resources in a coverage of an ultra-large cell, thereby improving paging experience of an NTN system.

The technical solutions of the disclosure will be described in detail hereinafter with reference to specific implementations.

Figure 2:
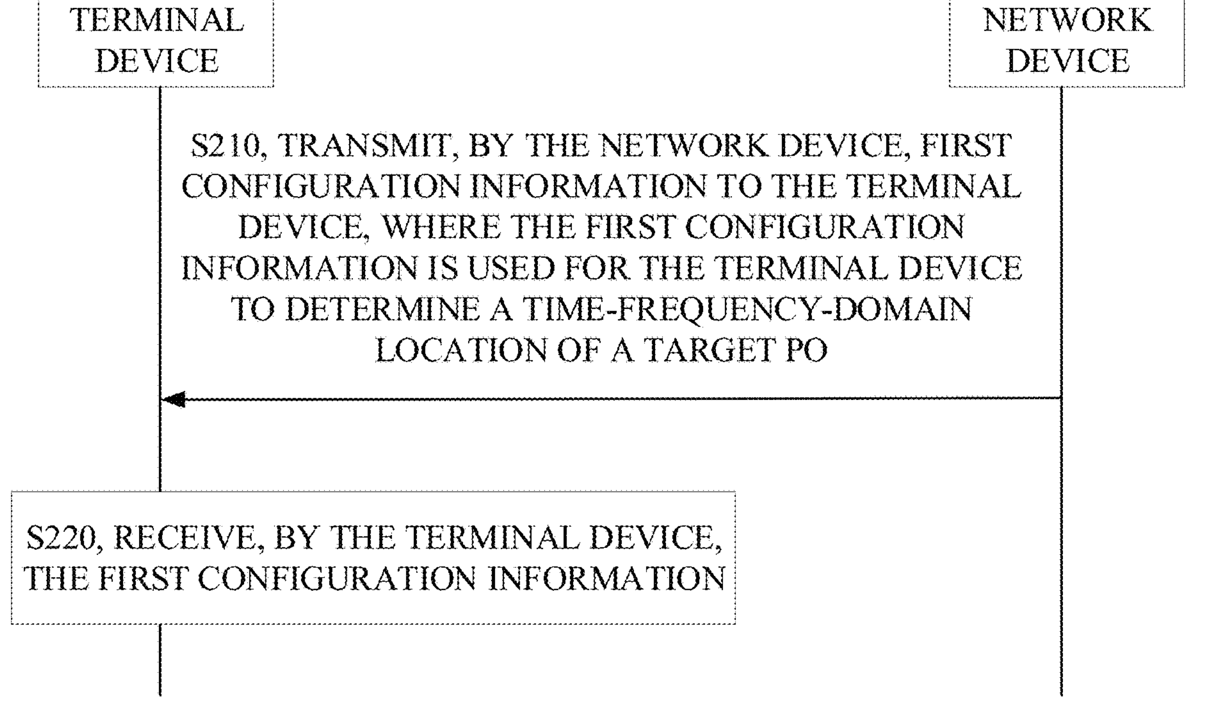
FIG. 2 is a schematic flow chart illustrating a method for wireless communication according to implementations of the disclosure.

FIG. 2 is a schematic flow chart illustrating a method 200 for wireless communication according to implementations of the disclosure. As illustrated in FIG. 2, the method 200 includes at least part of the following.

S210, a network device transmits first configuration information to a terminal device, where the first configuration information is used for the terminal device to determine a time-frequency-domain location of a target PO.

S220, the terminal device receives the first configuration information.

In implementations of the disclosure, after the terminal device receives the first configuration information, the terminal device may determine the time-frequency-domain location of the target PO according to the first configuration information, and perform paging message monitoring according to the time-frequency-domain location of the target PO.

In some implementations, the network device may transmit the first configuration information to the terminal device through a system broadcast message or dedicated signaling. For example, the first configuration information may be paging-control configuration information.

Implementations of the disclosure may be applicable to an NTN system or other network systems, which is not limited herein.

In some implementations, the terminal device receives a first indication, where the first indication indicates whether the terminal device determines the time-frequency-domain location of the target PO according to the first configuration information.

Specifically, after the terminal device receives the first indication, the terminal device can determine, based on the first indication, whether to determine the time-frequency-domain location of the target PO according to the first configuration information.

In some implementations, the first indication is carried in at least one of: dedicated signaling, medium access control control element (MAC CE) signaling, downlink control information (DCI), a system broadcast message, a paging short message, or a paging message.

In some implementations, in example 1, the first configuration information includes, but is not limited to, at least one of: a terminal-device type identity, at least one set of paging-search-space information, paging-common-parameter information, or frequency-domain information corresponding to the at least one set of paging-search-space information.

In some implementations, a terminal-device type may be classified according to at least one of: a maximum transmit power level supported by the terminal device, an application scenario supported by the terminal device, a bandwidth size supported by the terminal device, whether the terminal device accepts a service in a network of an operator subscribed by the terminal device, or the number of transmit antennas and/or the number of receive antennas supported by the terminal device.

It needs to be noted that the terminal-device type identity is a logical identity, and is intended to group a large number of terminal devices. Terminal devices in different groups use different paging-search-space configurations, thereby avoiding that a large number of terminal devices use the same set of paging-search-space configurations, and thus avoiding paging congestion. The terminal-device type identity is pre-defined by a protocol, pre-configured, or obtained through a non-access stratum (NAS) signaling process.

In some implementations, the paging-search-space information may include at least: an appearance period of the paging search space (i.e., a period every which a PDCCH for carrying the paging-control-channel content appears), an offset between a location where the paging search space actually appears and a start location of the appearance period of the paging search space, a duration of the paging search space in the appearance period of the paging search space, or symbols available for paging PDCCH search in 14 symbols in each slot in the duration of the paging search space.

It needs to be noted that the paging-common-parameter information generally includes multiple parameters, where these parameters may be configured at a cell granularity or a search-space granularity, which is not limited in the disclosure.

When the paging-common-parameter information is configured at the cell granularity, all terminal devices camped on the cell share a set of paging-common-parameter information. When the paging-common-parameter information is configured at the search-space granularity, each terminal device uses a set of paging-common-parameter information corresponding to paging-search-space information associated with the terminal device.

In some implementations, the paging-common-parameter information includes, but is not limited to, at least one of: an offset of a paging frame (PF), a paging cycle T (generally, a paging cycle is broadcast in SI and is suitable for all terminal devices, but if a terminal device negotiates a new paging cycle through an NAS, the terminal device uses the shortest cycle in multiple paging cycles as a paging cycle), the number of PFs per paging cycle, or the number of POs associated with a PF.

In some implementations, paging-search-space information is in one-to-one association with or in multiple-to-one association with frequency-domain information. For example, one set of paging-search-space information may correspond to one set of frequency-domain information. In a scenario of one-to-one association, frequency-domain information may be contained in associated paging-search-space information, or may be configured in other configuration information except the associated paging-search-space information. For another example, multiple sets of paging-search-space information may correspond to one set of frequency-domain information, which is not limited herein.

In some implementations, in the first configuration information, frequency-domain information corresponding to paging-search-space information is configured at the cell granularity or a search space granularity.

When the frequency-domain information corresponding to the paging-search-space information is configured at the cell granularity, all terminal devices camped on the cell share frequency-domain information corresponding to a set of paging-search-space information. When the frequency-domain information corresponding to the paging-search-space information is configured at the search-space granularity, each terminal device uses frequency-domain information corresponding to paging-search-space information associated with the terminal device.

In some implementations of example 1, the terminal device determines first paging-search-space information from the at least one set of paging-search-space information according to the terminal-device type identity of the terminal device and a first correspondence. The first correspondence includes a correspondence between terminal-device type identities and paging-search-space information. The terminal device determines a time-domain location of the target PO according to the first paging-search-space information, the paging-common-parameter information, system frame number (SFN) information, and a serving-temporary mobile subscriber identity (S-TMSI). The terminal device determines a frequency-domain location of the target PO according to frequency-domain information corresponding to the first paging-search-space information.

The first paging-search-space information is paging-search-space information associated with the terminal device.

In example 1, the terminal device calculates, according to the terminal-device type identity of the terminal device and the first correspondence, a set of paging-search-space information (i.e., the first paging-search-space information) that may be used by the terminal device, so as to determine the time-frequency-domain location of the target PO based on the first paging-search-space information.

In some implementations, the first correspondence is pre-configured, agreed by a protocol, or configured by the network device through the first configuration information.

For example, the first configuration information includes the first correspondence, where the first correspondence is used for the terminal device to determine, according to the terminal-device type identity of the terminal device, paging-search-space information associated with the terminal device from the at least one set of paging-search-space information.

It needs to be noted that the S-TMSI may be obtained by the terminal device from a network side after the terminal device is registered with the network side. When each terminal device is registered with the network side, the CN may assign a unique identity (i.e., an S-TMSI) to the terminal device through an NAS signaling process, where the identity is also one of parameters for the terminal device and the network side to calculate a time-domain location of a PO of the terminal device.

In some implementations of example 1, in the first correspondence, one terminal-device type identity corresponds to one paging-search-space information, or multiple terminal-device type identities correspond to one paging-search-space information.

For example, in the first correspondence, one terminal-device type identity corresponds to one paging-search-space information. That is, the terminal-device type identity and the paging-search-space information are in one-to-one correspondence, as illustrated in table 2 below.

TABLE 2

| terminal-device type identity 1 | terminal-device type identity 2 | . . . | terminal-device type identity N |
|---|---|---|---|
| paging-search-space information 1 | paging-search-space information 2 | . . . | paging-search-space information N |

For another example, in the first correspondence, multiple terminal-device type identities correspond to one paging-search-space information. That is, the terminal-device type identity and the paging-search-space information are in a multiple-to-one relationship, as illustrated in table 3 below.

TABLE 3

| | |
|---|---|
| terminal-device type identity 1<br>terminal-device type identity 2<br>terminal-device type identity 3 | paging-search-space information 1 |
| terminal-device type identity 4<br>terminal-device type identity 5 | paging-search-space information 2 |
| terminal-device type identity 6 | paging-search-space information 3 |

In table 3, terminal-device type identity 1 to terminal-device type identity 3 share paging-search-space information 1, and terminal-device type identity 4 and terminal-device type identity 5 share paging-search-space information 2.

Figure 3:
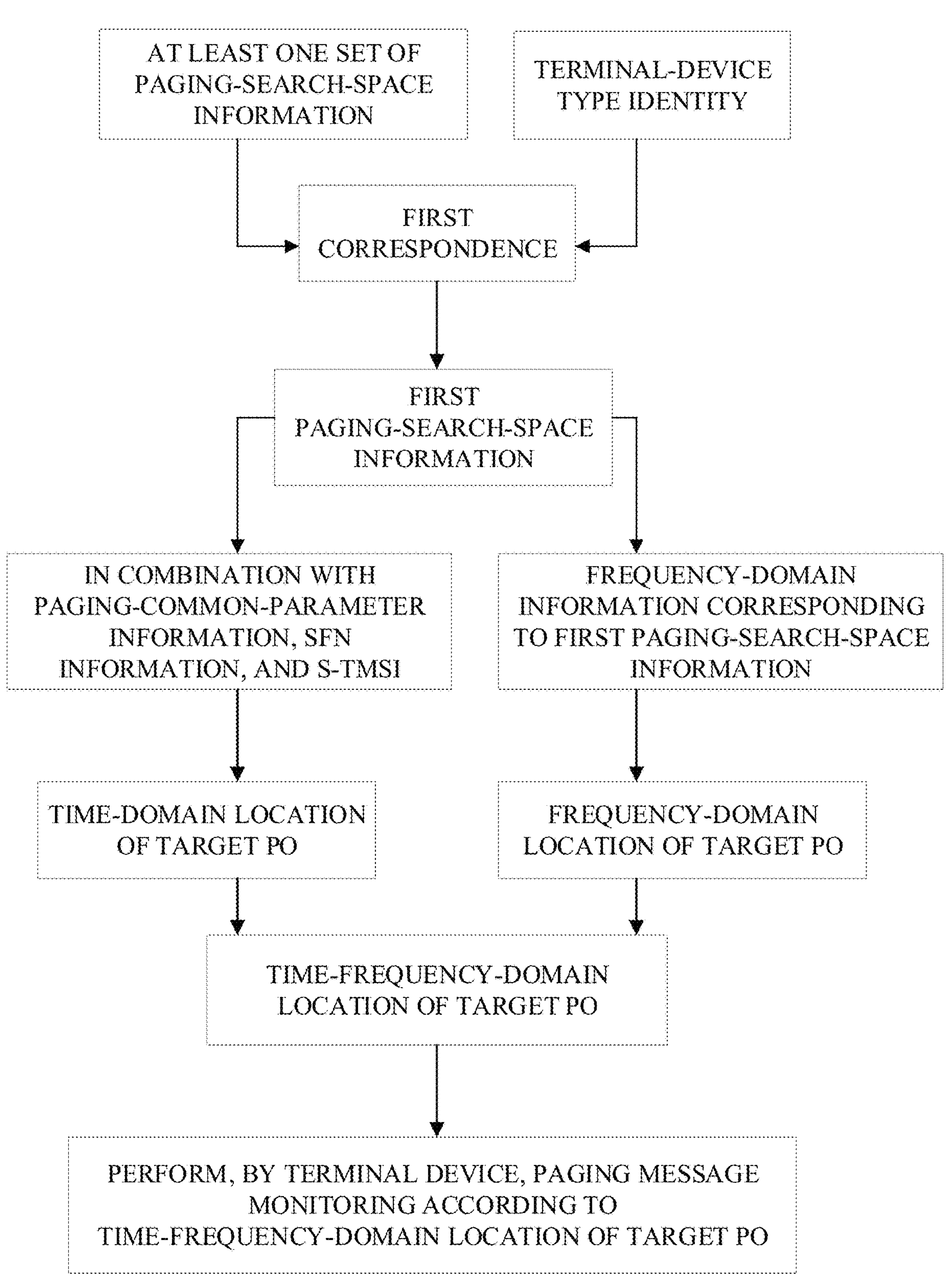
FIG. 3 is a schematic flow chart illustrating determination of a time-frequency-domain location of a target paging occasion (PO) according to implementations of the disclosure.

In some implementations of example 1, the terminal device may determine the time-frequency-domain location of the target PO based on a procedure illustrated in FIG. 3, and perform paging-message monitoring according to the time-frequency-domain location of the target PO.

In some implementations, in example 2, the first configuration information includes, but is not limited to, at least one of: n sets of paging-search-space information, paging-common-parameter information, or frequency-domain information corresponding to the n sets of paging-search-space information, where n is a positive integer, and n≥1.

In some implementations of example 2, the terminal device determines second paging-search-space information from the n sets of paging-search-space information according to an S-TMSI for the terminal device and a second correspondence. The second correspondence includes a correspondence between S-TMSIs and paging-search-space information. The terminal device determines the time-domain location of the target PO according to the second paging-search-space information, the paging-common-parameter information, the SFN information, and the S-TMSI. The terminal device determines the frequency-domain location of the target PO according to frequency-domain information corresponding to the second paging-search-space information.

The second paging-search-space information is paging-search-space information associated with the terminal device.

In example 2, the terminal device calculates, according to the S-TMSI acquired by the terminal device and the second correspondence, a set of paging-search-space information (i.e., the second paging-search-space information) that may be used by the terminal device, so as to determine the time-frequency-domain location of the target PO based on the second paging-search-space information.

In some implementations, in the second correspondence, if a value of the S-TMSI modulo M ranges from 0 to ((M/n)−1), the S-TMSI corresponds to a first set of paging-search-space information in the n sets of paging-search-space information; if the value of the S-TMSI modulo M ranges from (M/n) to ((2M/n)−1), the S-TMSI corresponds to a second set of paging-search-space information in the n sets of paging-search-space information; . . . ; if the value of the S-TMSI modulo M ranges from ((n−1)M/n) to (M−1), the S-TMSI corresponds to an n-th set of paging-search-space information in the n sets of paging-search-space information, where n and M are both positive integers, n≥1, and M≥2.

For example, M is 1024, and n is 4. If the value of the S-TMSI modulo 1024 ranges from 0 to 255, the S-TMSI corresponds to a first set of paging-search-space information in the 4 sets of paging-search-space information. If the value of the S-TMSI modulo 1024 ranges from 256 to 511, the S-TMSI corresponds to a second set of paging-search-space information in the 4 sets of paging-search-space information. If the value of the S-TMSI modulo 1024 ranges from 512 to 767, the S-TMSI corresponds to a third set of paging-search-space information in the 4 sets of paging-search-space information. If the value of the S-TMSI modulo 1024 ranges from 768 to 1023, the S-TMSI corresponds to a fourth set of paging-search-space information in the 4 sets of paging-search-space information.

It needs to be noted that the modulo operation rule is a remainder operation rule, for example, 10 mod 3=1, 12 mod 4=0, 6 mod 5=1, etc.

Note: the above manner of determining the paging-search-space information through performing the modulo operation on the S-TMSI is merely one of manners of achieving the second correspondence, other operation rules for achieving the second correspondence are not limited in the disclosure, but the core is to determine corresponding paging-search-space information through the S-TMSI for the terminal device.

In some implementations of example 2, the second correspondence is pre-configured, agreed by a protocol, or configured by the network device through the first configuration information.

For example, the first configuration information includes the second correspondence, where the second correspondence is used for the terminal device to determine, according to the S-TMSI for the terminal device, the paging-search-space information associated with the terminal device from the n sets of paging-search-space information.

Figure 4:
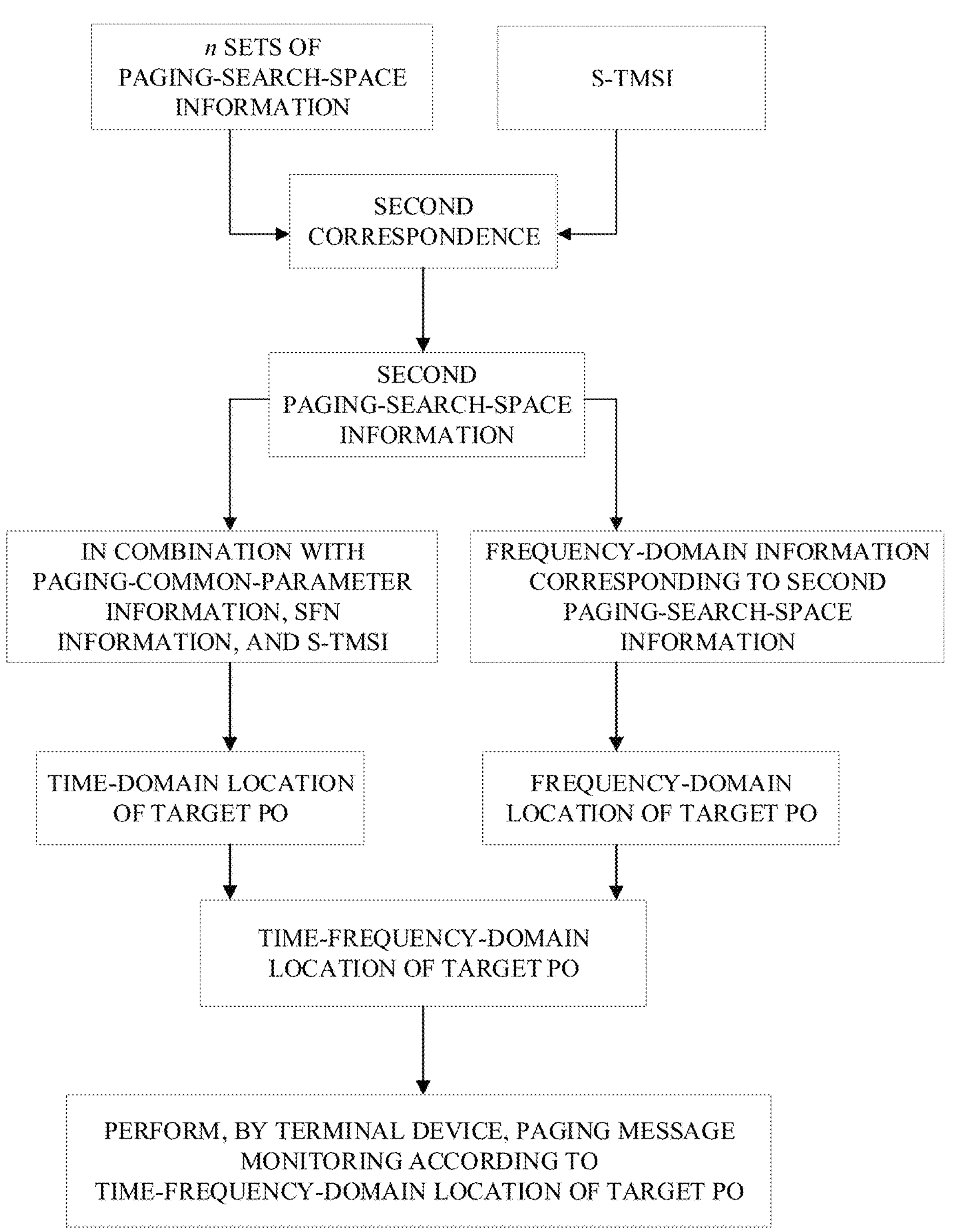
FIG. 4 is another schematic flow chart illustrating determination of a time-frequency-domain location of a target PO according to implementations of the disclosure.

In some implementations of example 2, the terminal device may determine the time-frequency-domain location of the target PO based on a procedure illustrated in FIG. 4, and perform paging-message monitoring according to the time-frequency-domain location of the target PO.

It needs to be noted that meanings of parameters such as the paging-search-space information, the paging-common-parameter information, the S-TMSI, and the correspondence between paging-search-space information and frequency-domain information in example 2 are similar to those described in example 1 and will not be repeated herein.

In some implementations, in example 3, the first configuration information includes, but is not limited to, at least one of: m sets of paging-search-space information, paging-common-parameter information, a PO frequency-division number W, or frequency-domain information corresponding to the m sets of paging-search-space information, where m and W are both positive integers, m≥1, and W≥1.

In some implementations, the PO frequency-division number W is configured at the cell granularity or the search space granularity.

Figure 5:
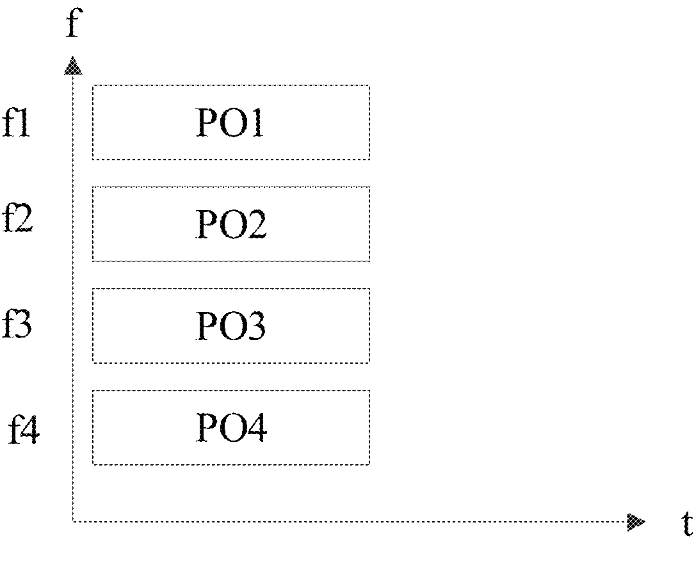
FIG. 5 is a schematic diagram illustrating PO frequency division according to implementations of the disclosure.

It needs to be noted that the number of POs corresponding to a time-domain PO in a frequency-domain dimension is determined according to the PO frequency-division number W. For example, W=4 means that one time-domain PO corresponds to four POs in the frequency-domain dimension. The four POs have the same time-domain location but different frequency-domain locations. As illustrated in FIG. 5, PO1 to PO4 are the same in the time domain but different in the frequency domain. W=4 indicates that one time-domain PO corresponds to four POs in the frequency domain dimension. Generally, there is a reference frequency-domain PO among the four frequency-domain POs. Frequency-domain information corresponding to the reference frequency-domain PO is frequency-domain information corresponding to paging-search-space information in the first configuration information. Frequency-domain information corresponding to other frequency-domain POs except the reference frequency-domain PO is deduced from the frequency-domain information corresponding to the paging-search-space information. For example, if the frequency-domain information corresponding to the paging-search-space information is f1 in FIG. 5, frequency-domain locations of f2 to f4 are deduced from f1. That is to say, in the case where the frequency-domain information (i.e., the reference frequency-domain information) corresponding to the paging-search-space information and the PO frequency-division number W are known, frequency-domain locations of W frequency-domain POs can be deduced.

When the PO frequency-division number W is configured at the cell granularity, all terminal devices camped on the cell share a PO frequency-division number W. When the PO frequency-division number W is configured at the search-space granularity, each terminal device uses a PO frequency-division number W corresponding to paging-search-space information associated with the terminal device.

In some implementations, one time-domain PO corresponds to W POs in the frequency domain due to the PO frequency-division number W. It is not enough for the terminal device to obtain the frequency-domain information (i.e., the reference frequency-domain information) corresponding to the paging-search-space information, and it is necessary for the terminal device to deduce which one of the W frequency-domain POs associated with the terminal device in further combination with an S-TMSI obtained from a network after the terminal device is registered with the network. For example, use the following modulo operation: K=floor ((S-TMSI mod 1024)/X) mod W, where W and X are both positive integers greater than or equal to 1, X may be a fixed value or may be deduced from several configuration parameters, 'floor ( )' is a rounding-down function, '/' represents arithmetic division, and S-TMSI is obtained from a network after the terminal device is registered with the network.

K=0 indicates that the terminal device is associated with the first one of the W frequency-domain POs. K=1 indicates that the terminal device is associated with the second one of the W frequency-domain POs. By analogy, K=W−1 indicates that the terminal device is associated with the W-th one of the W frequency-domain POs. The logical numbers between the W frequency-domain POs are specified by a protocol, which are known by the terminal device.

In some implementations of example 3, m=1, and the terminal device determines the time-domain location of the target PO according to the paging-search-space information (i.e., only one set of paging-search-space information), the paging-common-parameter information, the SFN information, and the S-TMSI. The terminal device determines the frequency-domain location of the target PO according to the frequency-domain information corresponding to the paging-search-space information, the PO frequency-division number W, and the S-TMSI.

The paging-search-space information is paging-search-space information associated with the terminal device.

Figure 6:
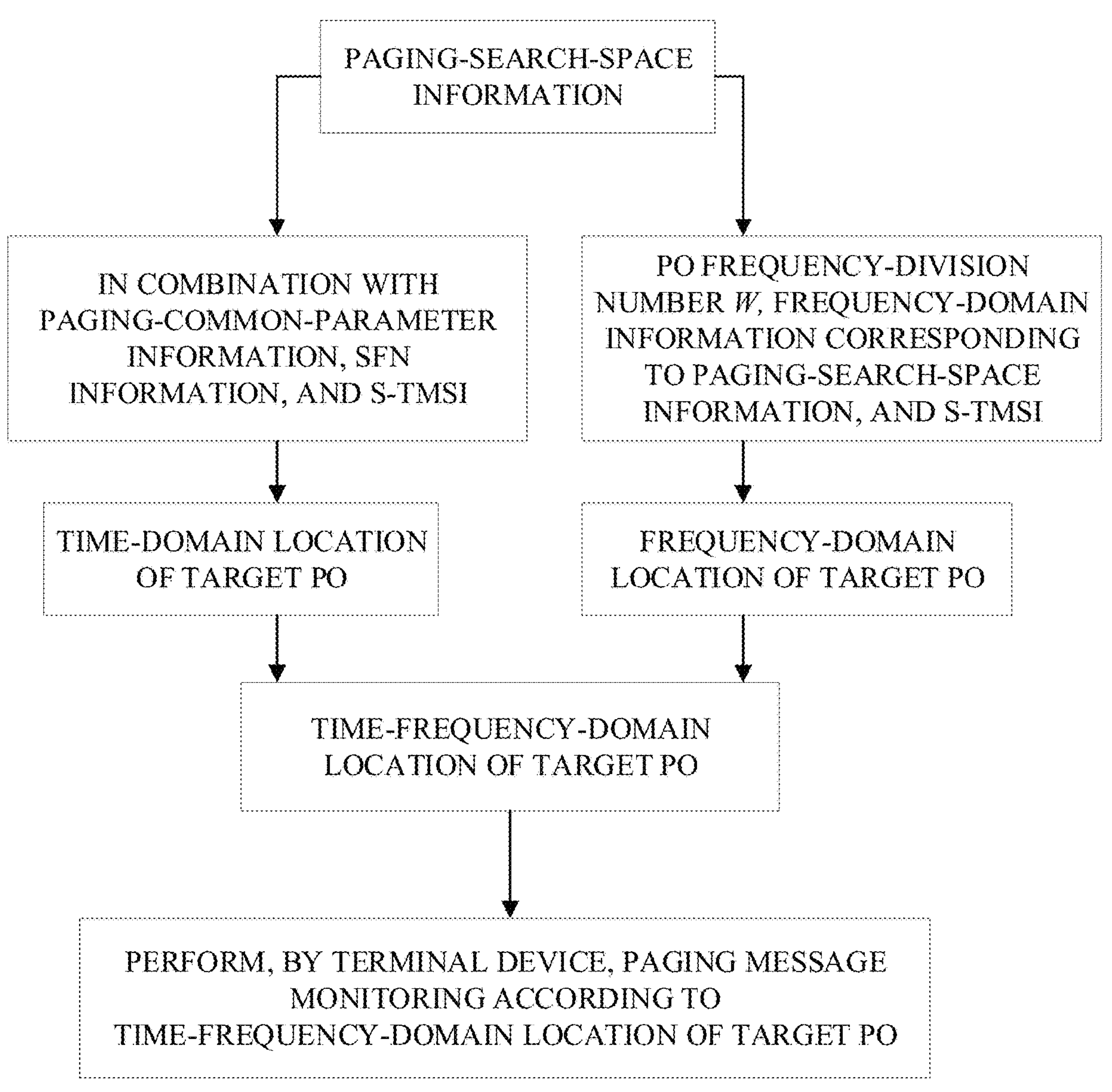
FIG. 6 is yet another schematic flow chart illustrating determination of a time-frequency-domain location of a target PO according to implementations of the disclosure.

In some implementations of example 3, m=1, and the terminal device may determine the time-frequency-domain location of the target PO based on a procedure illustrated in FIG. 6, and perform paging message monitoring according to the time-frequency-domain location of the target PO.

In some implementations of example 3, m>1, and the terminal device determines third paging-search-space information from the m sets of paging-search-space information according to the S-TMSI for the terminal device or the terminal-device type identity of the terminal device, and a third correspondence. The third correspondence includes a correspondence between S-TMSIs and paging-search-space information or a correspondence between terminal-device type identities and paging-search-space information. The terminal device determines the time-domain location of the target PO according to the third paging-search-space information, the paging-common-parameter information, the SFN information, and the S-TMSI. The terminal device determines the frequency-domain location of the target PO according to frequency-domain information corresponding to the third paging-search-space information, the PO frequency-division number W, and the S-TMSI.

The third paging-search-space information is paging-search-space information associated with the terminal device.

In some implementations, the third correspondence is the correspondence between S-TMSIs and paging-search-space information. In the third correspondence, if the value of the S-TMSI modulo M ranges from 0 to ((M/n)−1), the S-TMSI corresponds to a first set of paging-search-space information in the m sets of paging-search-space information; if the value of the S-TMSI modulo M ranges from (M/n) to ((2M/n)−1), the S-TMSI corresponds to a second set of paging-search-space information in the m sets of paging-search-space information; . . . ; if the value of the S-TMSI modulo M ranges from ((n−1)M/n) to (M−1), the S-TMSI corresponds to an m-th set of paging-search-space information in the m set of paging-search-space information, where m and M are both positive integers, m>1, and M≥2.

In some implementations, the third correspondence is the correspondence between terminal-device type identities and paging-search-space information. In the third correspondence, one terminal-device type identity corresponds to one paging-search-space information, or multiple terminal-device type identities correspond to one paging-search-space information.

In some implementations, the third correspondence is pre-configured, agreed by a protocol, or configured by the network device through the first configuration information.

For example, m>1, and the first configuration information includes a third correspondence, where the third correspondence is used for the terminal device to determine, according to the S-TMSI for the terminal device or the terminal-device type identity of the terminal device, the paging-search-space information associated with the terminal device from the m sets of paging-search-space information.

Figure 7:
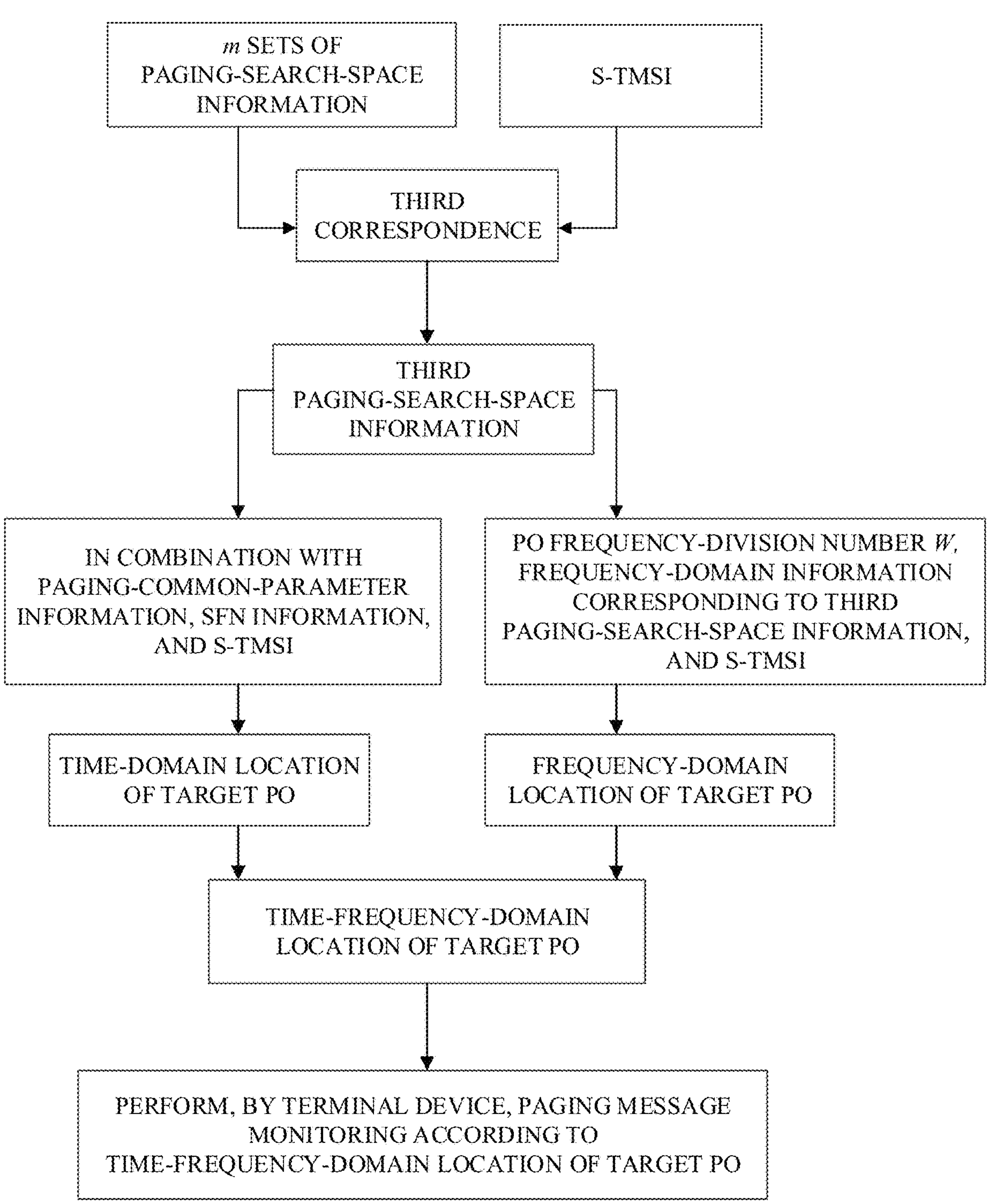
FIG. 7 is yet another schematic flow chart illustrating determination of a time-frequency-domain location of a target PO according to implementations of the disclosure.

In some implementations of example 3, m>1, and the third correspondence includes the correspondence between S-TMSIs and paging-search-space information. The terminal device may determine the time-frequency-domain location of the target PO based on a procedure as illustrated in FIG. 7, and perform paging message monitoring according to the time-frequency-domain location of the target PO.

Figure 8:
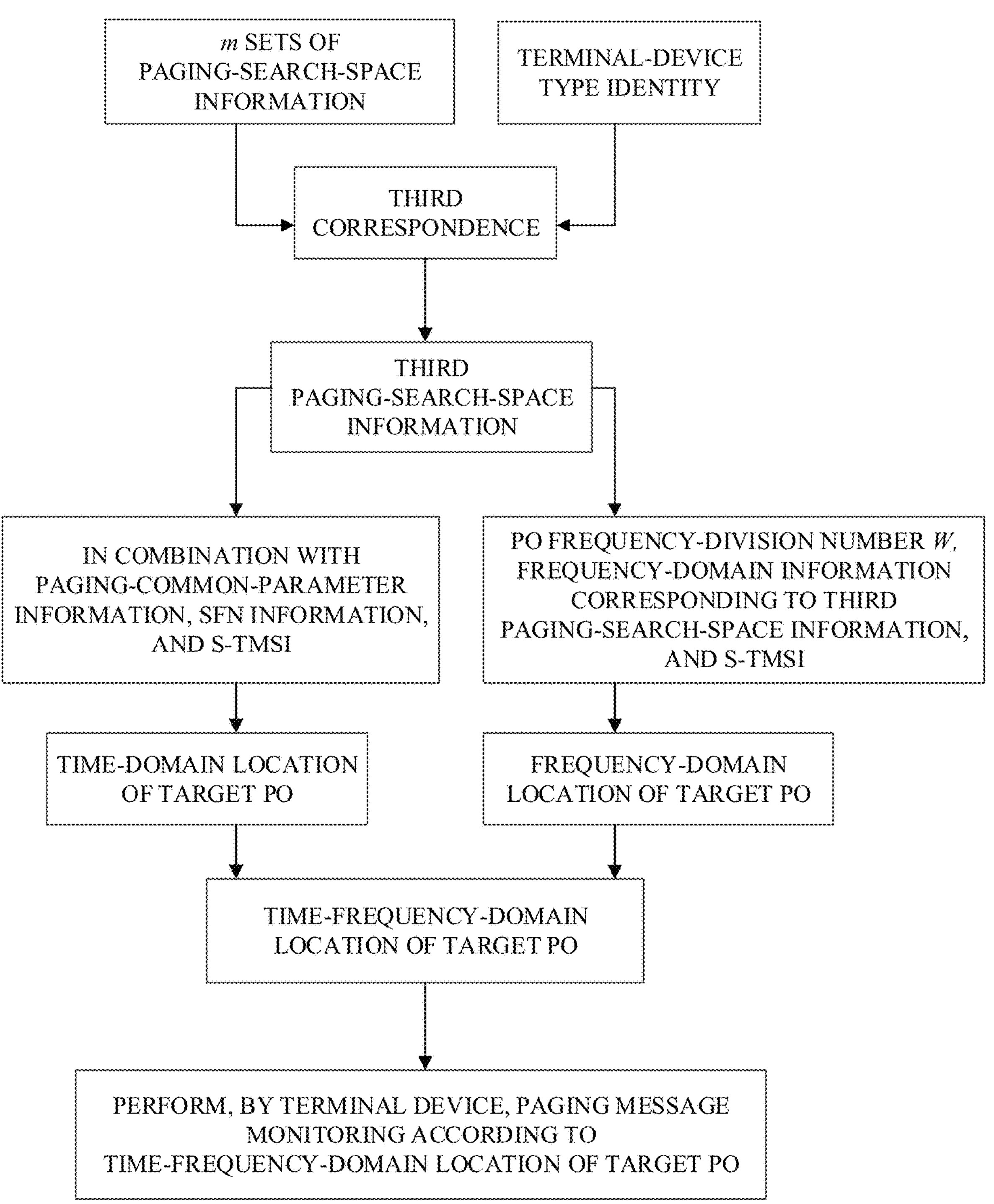
FIG. 8 is yet another schematic flow chart illustrating determination of a time-frequency-domain location of a target PO according to implementations of the disclosure.

In some implementations of example 3, m>1, and the third correspondence includes the correspondence between terminal-device type identities and paging-search-space information. The terminal device may determine the time-frequency-domain location of the target PO based on a procedure as illustrated in FIG. 8, and perform paging message monitoring according to the time-frequency-domain location of the target PO.

It needs to be noted that the meanings of parameters such as the paging-search-space information, the paging-common-parameter information, the S-TMSI, and the correspondence between paging-search-space information and frequency-domain information in example 3 are similar to those described in example 1 and will not be repeated herein.

Therefore, in implementations of the disclosure, the terminal device can determine the time-frequency-domain location of the target PO according to the configuration information transmitted by the network device, so that a paging capacity can be improved, and shortage or even congestion of paging resources in a coverage of an ultra-large cell can be solved.

Furthermore, the ultra-large cell may be a satellite cell, so that paging experience of the NTN system can be improved based on the solutions of implementations of the disclosure.

The above illustrates in detail the method implementations of the disclosure with reference to FIGS. 2 to 8, and the following will illustrate in detail apparatus implementations of the disclosure with reference to FIGS. 9 to 13. It can be understood that, the apparatus implementations correspond to the method implementations, and for similar illustrations, reference can be made to the terminal-side implementations.

Figure 9:
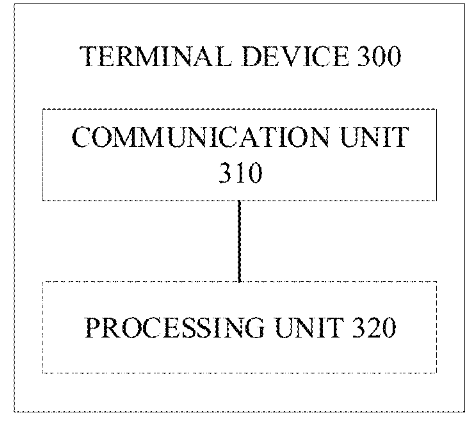
FIG. 9 is a schematic block diagram of a terminal device according to implementations of the disclosure.

FIG. 9 is a schematic block diagram of a terminal device 300 according to implementations of the disclosure. As illustrated in FIG. 9, the terminal device 300 includes a communication unit 310. The communication unit 310 is configured to receive first configuration information, where the first configuration information is used for the terminal device to determine a time-frequency-domain location of a target PO.

In some implementations, the first configuration information includes at least one of: a terminal-device type identity, at least one set of paging-search-space information, paging-common-parameter information, or frequency-domain information corresponding to the at least one set of paging-search-space information.

In some implementations, the terminal device 300 further includes a processing unit 320. The processing unit 320 is configured to determine first paging-search-space information from the at least one set of paging-search-space information according to the terminal-device type identity of the terminal device and a first correspondence. The first correspondence includes a correspondence between terminal-device type identities and paging-search-space information. The processing unit 320 is configured to determine a time-domain location of the target PO according to the first paging-search-space information, the paging-common-parameter information, SFN information, and an S-TMSI. The processing unit 320 is configured to determine a frequency-domain location of the target PO according to frequency-domain information corresponding to the first paging-search-space information.

In some implementations, in the first correspondence, one terminal-device type identity corresponds to one paging-search-space information, or multiple terminal-device type identities correspond to one paging-search-space information.

In some implementations, the first correspondence is pre-configured, agreed by a protocol, or configured by a network device through the first configuration information.

In some implementations, a terminal-device type is classified according to at least one of: a maximum transmit power level supported by the terminal device, an application scenario supported by the terminal device, a bandwidth size supported by the terminal device, whether the terminal device accepts a service in a network of an operator subscribed by the terminal device, or the number of transmit antennas and/or the number of receive antennas supported by the terminal device.

In some implementations, the first configuration information includes at least one of: n sets of paging-search-space information, paging-common-parameter information, or frequency-domain information corresponding to the n sets of paging-search-space information, where n is a positive integer, and $n \geq 1$.

In some implementations, the terminal device 300 further includes a processing unit 320. The processing unit 320 is configured to determine second paging-search-space information from the n sets of paging-search-space information according to an S-TMSI for the terminal device and a second correspondence. The second correspondence includes a correspondence between S-TMSIs and paging-search-space information. The processing unit 320 is configured to determine the time-domain location of the target PO according to the second paging-search-space information, the paging-common-parameter information, the SFN information, and the S-TMSI. The processing unit 320 is configured to determine the frequency-domain location of the target PO according to frequency-domain information corresponding to the second paging-search-space information.

In some implementations, in the second correspondence, if a value of the S-TMSI modulo M ranges from 0 to $((M/n)-1)$, the S-TMSI corresponds to a first set of paging-search-space information in the n sets of paging-search-space information; if the value of the S-TMSI modulo M ranges from $(M/n)$ to $((2M/n)-1)$, the S-TMSI corresponds to a second set of paging-search-space information in the n sets of paging-search-space information; . . . ; if the value of the S-TMSI modulo M ranges from $((n-1)M/n)$ to $(M-1)$, the S-TMSI corresponds to an n-th set of paging-search-space information in the n sets of paging-search-space information, where n and M are both positive integers, $n \geq 1$, and $M \geq 2$.

In some implementations, the second correspondence is pre-configured, agreed by a protocol, or configured by a network device through the first configuration information.

In some implementations, the first configuration information includes at least one of: m sets of paging-search-space information, paging-common-parameter information, a PO frequency-division number W, or frequency-domain information corresponding to the m sets of paging-search-space information, where m and W are both positive integers, $m \geq 1$, and $W \geq 1$.

In some implementations, $m>1$, and the terminal device 300 further includes a processing unit 320. The processing unit 320 is configured to determine third paging-search-space information from the m sets of paging-search-space information according to the S-TMSI for the terminal device or the terminal-device type identity of the terminal device, and a third correspondence. The third correspondence includes the correspondence between S-TMSIs and paging-search-space information or the correspondence between terminal-device type identities and paging-search-space information. The processing unit 320 is configured to determine the time-domain location of the target PO according to the third paging-search-space information, the paging-common-parameter information, the SFN information, and the S-TMSI. The processing unit 320 is configured to determine the frequency-domain location of the target PO according to frequency-domain information corresponding to the third paging-search-space information, the PO frequency-division number W, and the S-TMSI.

In some implementations, the third correspondence is the correspondence between S-TMSIs and paging-search-space information. In the third correspondence, if the value of the S-TMSI modulo M ranges from 0 to $((M/n)-1)$, the S-TMSI corresponds to a first set of paging-search-space information in the m sets of paging-search-space information; if the value of the S-TMSI modulo M ranges from $(M/n)$ to $((2M/n)-1)$, the S-TMSI corresponds to a second set of paging-search-space information in the m sets of paging-search-space information; . . . ; if the value of the S-TMSI modulo M ranges from $((n-1)M/n)$ to $(M-1)$, the S-TMSI corresponds to an m-th set of paging-search-space information in the m set of paging-search-space information, where m and M are both positive integers, $m>1$, and $M \geq 2$.

In some implementations, the third correspondence is the correspondence between terminal-device type identities and paging-search-space information. In the third correspondence, one terminal-device type identity corresponds to one paging-search-space information, or multiple terminal-device type identities correspond to one paging-search-space information.

In some implementations, the third correspondence is pre-configured, agreed by a protocol, or configured by a network device through the first configuration information.

In some implementations, $m=1$, and the terminal device 300 further includes a processing unit 320. The processing unit 320 is configured to determine the time-domain location of the target PO according to the paging-search-space information, the paging-common-parameter information, the SFN information, and the S-TMSI. The processing unit 320 is configured to determine the frequency-domain location of the target PO according to the frequency-domain information corresponding to the paging-search-space information, the PO frequency-division number W, and the S-TMSI.

In some implementations, the PO frequency-division number W is configured at a cell granularity or a search space granularity.

In some implementations, in the first configuration information, frequency-domain information corresponding to paging-search-space information is configured at a cell granularity or a search space granularity.

In some implementations, the communication unit 310 is further configured to receive a first indication, where the first indication indicates whether the terminal device determines the time-frequency-domain location of the target PO according to the first configuration information.

In some implementations, the first indication is carried in at least one of: dedicated signaling, MAC CE signaling, DCI, a system broadcast message, a paging short message, or a paging message.

In some implementations, the communication unit may be a communication interface or a transceiver, or an input/output interface of a communication chip or a system on a chip (SOC). The above processing unit may be one or more processors.

It can be understood that, according to implementations of the disclosure, the terminal device 300 can correspond to the terminal device in the method implementations of the disclosure, and the above-mentioned and other operations and/or functions of each unit in the terminal device 300 respectively implement a corresponding procedure performed by the terminal device in the method 200 illustrated in FIG. 2, which will not be repeated herein for sake of simplicity.

Figure 10:
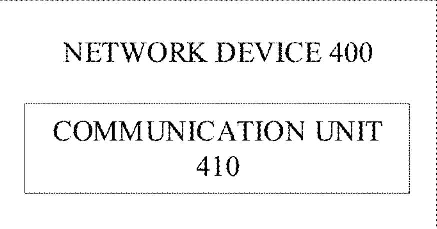
FIG. 10 is a schematic block diagram of a network device according to implementations of the disclosure.

FIG. 10 is a schematic block diagram of a network device 400 according to implementations of the disclosure. As illustrated in FIG. 10, the network device 400 includes a communication unit 410. The communication unit 410 is configured to transmit first configuration information to a terminal device, where the first configuration information is used for the terminal device to determine a time-frequency-domain location of a target PO.

In some implementations, the first configuration information includes at least one of: a terminal-device type identity, at least one set of paging-search-space information, paging-common-parameter information, or frequency-domain information corresponding to the at least one set of paging-search-space information.

In some implementations, the first configuration information further includes a first correspondence. The first correspondence includes a correspondence between terminal-device type identities and paging-search-space information. The first correspondence is used for the terminal device to determine, according to the terminal-device type identity of the terminal device, paging-search-space information associated with the terminal device from the at least one set of paging-search-space information.

In some implementations, in the first correspondence, one terminal-device type identity corresponds to one paging-search-space information, or multiple terminal-device type identities correspond to one paging-search-space information.

In some implementations, a terminal-device type is classified according to at least one of: a maximum transmit power level supported by the terminal device, an application scenario supported by the terminal device, a bandwidth size supported by the terminal device, whether the terminal device accepts a service in a network of an operator subscribed by the terminal device, or the number of transmit antennas and/or the number of receive antennas supported by the terminal device.

In some implementations, the first configuration information includes at least one of: n sets of paging-search-space information, paging-common-parameter information, or frequency-domain information corresponding to the n sets of paging-search-space information, where n is a positive integer, and n≥1.

In some implementations, the first configuration information further includes a second correspondence. The second correspondence includes a correspondence between S-TMSIs and paging-search-space information, and the second correspondence is used for the terminal device to determine, according to an S-TMSI for the terminal device, the paging-search-space information associated with the terminal device from the n sets of paging-search-space information.

In some implementations, in the second correspondence, if a value of the S-TMSI modulo M ranges from 0 to ((M/n)−1), the S-TMSI corresponds to a first set of paging-search-space information in the n sets of paging-search-space information; if the value of the S-TMSI modulo M ranges from (M/n) to ((2M/n)−1), the S-TMSI corresponds to a second set of paging-search-space information in the n sets of paging-search-space information; . . . ; if the value of the S-TMSI modulo M ranges from ((n−1)M/n) to (M−1), the S-TMSI corresponds to an n-th set of paging-search-space information in the n sets of paging-search-space information, where n and M are both positive integers, n≥1, and M≥2.

In some implementations, the first configuration information includes at least one of: m sets of paging-search-space information, paging-common-parameter information, a PO frequency-division number W, or frequency-domain information corresponding to the m sets of paging-search-space information, where m and W are both positive integers, m≥1, and W≥1.

In some implementations, m>1, and the first configuration information further includes a third correspondence. The third correspondence includes the correspondence between S-TMSIs and paging-search-space information or the correspondence between terminal-device type identities and paging-search-space information. The third correspondence is used for the terminal device to determine, according to the S-TMSI for the terminal device or the terminal-device type identity of the terminal device, the paging-search-space information associated with the terminal device from the m sets of paging-search-space information.

In some implementations, the third correspondence is the correspondence between S-TMSIs and paging-search-space information. In the third correspondence, if the value of the S-TMSI modulo M ranges from 0 to ((M/n)−1), the S-TMSI corresponds to a first set of paging-search-space information in the m sets of paging-search-space information; if the value of the S-TMSI modulo M ranges from (M/n) to ((2M/n)−1), the S-TMSI corresponds to a second set of paging-search-space information in the m sets of paging-search-space information; . . . ; if the value of the S-TMSI modulo M ranges from ((n−1)M/n) to (M−1), the S-TMSI corresponds to an m-th set of paging-search-space information in the m set of paging-search-space information, where m and M are both positive integers, m>1, and M≥2.

In some implementations, the third correspondence is the correspondence between terminal-device type identities and paging-search-space information. In the third correspondence, one terminal-device type identity corresponds to one paging-search-space information, or multiple terminal-device type identities correspond to one paging-search-space information.

In some implementations, the PO frequency-division number W is configured at a cell granularity or a search space granularity.

In some implementations, in the first configuration information, frequency-domain information corresponding to paging-search-space information is configured at a cell granularity or a search space granularity.

In some implementations, the communication unit 410 is further configured to transmit a first indication to the terminal device, where the first indication indicates whether the terminal device determines the time-frequency-domain location of the target PO according to the first configuration information.

In some implementations, the first indication is carried in at least one of: dedicated signaling, MAC CE signaling, DCI, a system broadcast message, a paging short message, or a paging message.

In some implementations, the communication unit may be a communication interface or a transceiver, or an input/output interface of a communication chip or an SOC.

It can be understood that, according to implementations of the disclosure, the network device 400 can correspond to the network device in the method implementations of the disclosure, and the above-mentioned and other operations and/or functions of each unit in the network device 400 respectively implement a corresponding procedure performed by the network device in the method 200 illustrated in FIG. 2, which will not be repeated herein for sake of simplicity.

Figure 11:
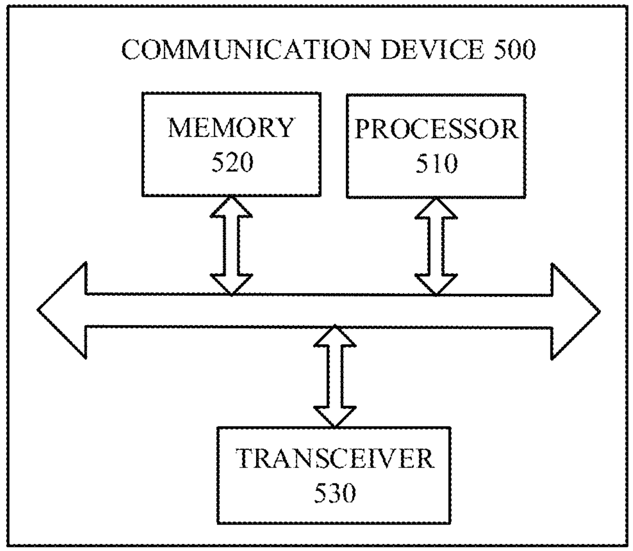
FIG. 11 is a schematic block diagram of a communication device according to implementations of the disclosure.

FIG. 11 is a schematic block diagram of a communication device 500 according to implementations of the disclosure. As illustrated in FIG. 11, the communication device 500 includes a processor 510. The processor 510 is configured to invoke and execute computer programs stored in a memory, to perform the methods in the implementations of the disclosure.

In some implementations, as illustrated in FIG. 11, the communication device 500 further includes a memory 520. The processor 510 is configured to invoke and execute computer programs stored in the memory 520, to perform the methods in the implementations of the disclosure.

The memory 520 may be a separate device from the processor 510, or be integrated into the processor 510.

In some implementations, as illustrated in FIG. 5, the communication device 500 further includes a transceiver 530. The processor 510 can control the transceiver 530 to communicate with other devices. Specifically, the transceiver 530 can transmit information or data to other devices, or receive information or data transmitted by other devices.

The transceiver 530 may include a transmitter and a receiver, and further include one or more antennas.

In some implementations, the communication device 500 may be the network device in the implementations of the disclosure, and the communication device 500 can implement a corresponding process implemented by the network device in each of the methods of the implementations of the disclosure, which will not be repeated herein for the sake of simplicity.

In some implementations, the communication device 500 may specifically be the terminal device in the implementations of the disclosure, and the communication device 500 can implement a corresponding process implemented by the terminal device in each of the methods of the implementations of the disclosure, which will not be repeated herein for the sake of simplicity.

Figure 12:
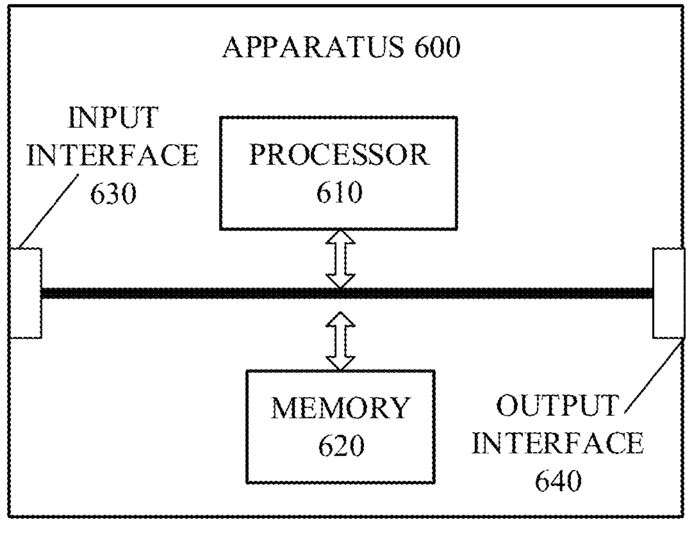
FIG. 12 is a schematic block diagram of an apparatus according to implementations of the disclosure.

FIG. 12 is a schematic block diagram of an apparatus according to implementations of the disclosure. As illustrated in FIG. 12, an apparatus 600 includes a processor 610. The processor 610 is configured to invoke and execute computer programs stored in a memory, to perform the methods in the implementations of the disclosure.

In some implementations, as illustrated in FIG. 12, the apparatus 600 further includes a memory 620. The processor 610 is configured to invoke and execute computer programs stored in the memory 620, to perform the methods in the implementations of the disclosure.

The memory 620 may be a separate device from the processor 610, or be integrated into the processor 610.

In some implementations, the apparatus 600 may further include an input interface 630. The processor 610 can control the input interface 630 to communicate with other devices or chips. Specifically, the input interface 630 can obtain information or data transmitted by other devices or chips.

In some implementations, the apparatus 600 may further include an output interface 640. The processor 610 can control the output interface 640 to communicate with other devices or chips. Specifically, the output interface 640 can output information or data to other devices or chips.

In some implementations, the apparatus can be applicable to the network device in the implementations of the disclosure, and the apparatus can implement a corresponding process implemented by the network device in each of the methods in the implementations of the disclosure, which will not be repeated herein for the sake of simplicity.

In some implementations, the apparatus can be applicable to the terminal device in the implementations of the disclosure, and the apparatus can implement a corresponding process implemented by the terminal device in each of the methods in the implementations of the disclosure, which will not be repeated herein for the sake of simplicity.

It can be understood that, the apparatus mentioned in the implementations of the disclosure may also be called a chip such as a system-level chip, a system chip, a chip system, a system-on-a-chip chip, or the like.

Figure 13:
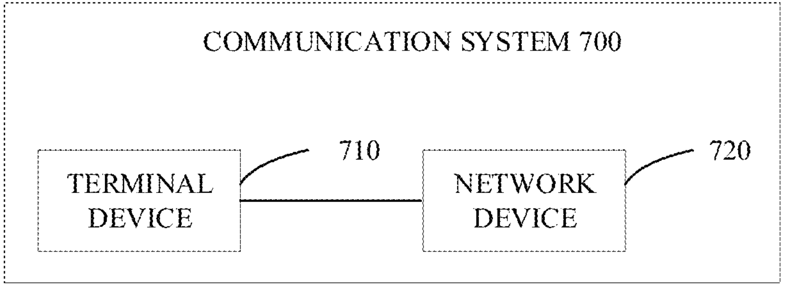
FIG. 13 is a schematic block diagram of a communication system according to implementations of the disclosure.

FIG. 13 is a schematic block diagram of a communication system 700 according to implementations of the disclosure. As illustrated in FIG. 13, the communication system 700 includes a terminal device 710 and a network device 720.

The terminal device 710 can be configured to implement a corresponding function implemented by the terminal device in the foregoing methods, and the network device 720 can be configured to implement a corresponding function implemented by the network device in the foregoing methods, which will not be repeated herein for the sake of simplicity.

It can be understood that, the processor in the implementations of the disclosure may be an integrated circuit chip with signal processing capabilities. During implementation, each step of the foregoing methods may be completed by an integrated logic circuit in the form of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in the implementations of the disclosure can be implemented or executed. The general purpose processor may be a microprocessor, or the processor may be any conventional processor or the like. The steps of the method disclosed in the implementations of the disclosure may be directly implemented as a hardware decoding processor, or may be performed by hardware and software modules in the decoding processor. The software module can be located in a storage medium such as a random access memory (RAM), a flash memory, a read only memory (ROM), a programmable read-only memory (PROM) or an electrically erasable programmable memory, registers, and the like. The storage medium is located in the memory. The processor reads the information in the memory, and completes the steps of the above-mentioned method with the hardware thereof.

It can be understood that, in implementations of the disclosure, the memory may be a volatile memory or a non-volatile memory, or may include both the volatile memory and the non-volatile memory. The non-volatile memory may be an ROM, a PROM, an erasable programmable read-only memory (EPROM), an electrically erasable programmable read-only memory (EEPROM), or a flash memory. The volatile memory can be an RAM that acts as an external cache. By way of example but not limitation, many forms of RAM are available, such as a static random access memory (SRAM), a dynamic random access memory (DRAM), a synchronous dynamic random access memory (SDRAM), a double data rate SDRAM (DDRSDRAM), an enhanced SDRAM (ESDRAM), a synclink dynamic random access memory (SLDRAM), and a direct rambus random access memory (DRRAM).

It can be understood that, the above-mentioned memory is an example but not limitation. For example, the memory may be an SRAM, a DRAM, an SDRAM, a DDRSDRAM, an ESDRAM, an SLDRAM, and a DRRAM. That is to say, the memory described herein is intended to include, but is not limited to, these and any other suitable types of memory.

A computer-readable storage medium is further provided in implementations of the disclosure. The computer-readable storage medium is configured to store computer programs.

In some implementations, the computer-readable storage medium may be applicable to the network device in implementations of the disclosure, and the computer programs enable a computer to perform a corresponding process implemented by the network device in each of the methods in implementations of the disclosure, which will not be repeated herein for the sake of simplicity.

In some implementations, the computer-readable storage medium may be applicable to the terminal device in implementations of the disclosure, and the computer programs enable a computer to perform a corresponding process implemented by the terminal device in each of methods in implementations of the disclosure, which will not be repeated herein for the sake of simplicity.

A computer program product is further provided in implementations of the disclosure. The computer program product includes computer program instructions.

In some implementations, the computer program product may be applicable to the network device in implementations of the disclosure, and the computer programs enable a computer to perform a corresponding process implemented by the network device in each of the methods in implementations of the disclosure, which will not be repeated herein for the sake of simplicity.

In some implementations, the computer program product may be applicable to the terminal device in implementations of the disclosure, and the computer programs enable a computer to perform a corresponding process implemented by the terminal device in each of methods in implementations of the disclosure, which will not be repeated herein for the sake of simplicity.

A computer program is further provided in implementations of the disclosure.

In some implementations, the computer program may be applicable to the network device in implementations of the disclosure, and the computer program, when running on a computer, enables the computer to perform a corresponding process implemented by the network device in each of the methods in implementations of the disclosure, which will not be repeated herein for the sake of simplicity.

In some implementations, the computer program may be applicable to the terminal device in implementations of the disclosure, and the computer program, when running on a computer, enables the computer to perform a corresponding process implemented by the terminal device in each of the methods in implementations of the disclosure, which will not be repeated herein for the sake of simplicity.

Those of ordinary skill in the art can appreciate that units and algorithmic operations of various examples described in connection with the implementations herein can be implemented by electronic hardware or by a combination of computer software and electronic hardware. Whether these functions are performed by means of hardware or software depends on particular application and design constraints of the technical solution. Those skilled in the art may use different methods with regard to each particular application to implement the described functionality, but such methods should not be regarded as lying beyond the scope of the disclosure.

It may be evident to those skilled in the art that, for the sake of convenience and simplicity, in terms of the working processes of the foregoing systems, apparatuses, and units, reference can be made to the corresponding processes of the above-mentioned method implementations, which will not be repeated herein.

It may be appreciated that the systems, apparatuses, and methods disclosed in the implementations herein may also be implemented in various other manners. For example, the above-mentioned apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components or parts displayed as units may or may not be physical units, and may reside at one location or may be distributed to multiple networked units. Some of or all the units may be selectively adopted according to practical needs to achieve desired objectives of the disclosure.

Various functional units described in the implementations herein may be integrated into one processing unit or may be present as a number of physically separated units, and two or more units may be integrated into one.

If the functions are implemented as software functional units and sold or used as SA products, they may be stored in a computer-readable storage medium. Based on such an understanding, the technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in the implementations of the disclosure. The above-mentioned storage medium may include various kinds of medium that can store program codes, such as a universal serial bus (USB) flash disk, a mobile hard drive, an ROM, an RAM, a magnetic disk, or an optical disk.

The above is only a specific implementation of the disclosure and is not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for wireless communication, comprising:

receiving, by a terminal device, first configuration information from a network device, the first configuration information being used for the terminal device to determine a time-frequency-domain location of a target paging occasion (PO);

wherein either:

(a) the first configuration information comprises at least one of:

a terminal-device type identity, wherein the terminal device type identity is a logical identity intended to group a large number of terminal devices, and terminal devices in different groups use different paging-search-space configurations;

at least one set of paging-search-space information;

paging-common-parameter information, wherein the paging-common-parameter information comprises at least one of: an offset of a paging frame (PF), a paging cycle T, number of PFs per paging cycle, or number of POs associated with a PF; or frequency-domain information corresponding to the at least one set of paging-search-space information, and the method further comprises:

determining, by the terminal device, first paging-search-space information from the at least one set of paging-search-space information according to the terminal-device type identity of the terminal device and a first correspondence, wherein the first correspondence comprises a correspondence between terminal-device type identities and paging-search-space information;

determining, by the terminal device, a time-domain location of the target PO according to the first paging-search-space information, the paging-common-parameter information, system frame number (SFN) information, and a serving-temporary mobile subscriber identity (S-TMSI); and determining, by the terminal device, a frequency-domain location of the target PO according to frequency-domain information corresponding to the first paging-search-space information; or (b) the first configuration information comprises at least one of:

n sets of paging-search-space information, the paging-common-parameter information, or frequency-domain information corresponding to the n sets of paging-search-space information, wherein n is a positive integer, and n≥1, and the method further comprises:

determining, by the terminal device, second paging-search-space information from the n sets of paging-search-space information according to the S-TMSI for the terminal device and a second correspondence, wherein the second correspondence comprises a correspondence between S-TMSIs and paging-search-space information;

determining, by the terminal device, the time-domain location of the target PO according to the second paging-search-space information, the paging-common-parameter information, the SFN information, and the S-TMSI; and determining, by the terminal device, the frequency-domain location of the target PO according to frequency-domain information corresponding to the second paging-search-space information; or (c) the first configuration information comprises at least one of:

m sets of paging-search-space information, the paging-common-parameter information, a PO frequency-division number W, or frequency-domain information corresponding to the m sets of paging-search-space information, wherein m and W are both positive integers, m≥1, and W≥1, wherein, in the case where m≥1, the method further comprises:

determining, by the terminal device, third paging-search-space information from the m sets of paging-search-space information according to the S-TMSI for the terminal device or the terminal-device type identity of the terminal device, and a third correspondence, wherein the third correspondence comprises a correspondence between S-TMSIs and paging-search-space information or a correspondence between terminal-device type identities and paging-search-space information;

determining, by the terminal device, the time-domain location of the target PO according to the third paging-search-space information, the paging-common-parameter information, the SFN information, and the S-TMSI; and determining, by the terminal device, the frequency-domain location of the target PO according to frequency-domain information corresponding to the third paging-search-space information, the PO frequency-division number W, and the S-TMSI.

2. The method of claim 1, wherein in the first correspondence, one terminal-device type identity corresponds to one paging-search-space information, or a plurality of terminal-device type identities correspond to one paging-search-space information.

3. The method of claim 1, wherein a terminal-device type is classified according to at least one of:

a maximum transmit power level supported by the terminal device;

an application scenario supported by the terminal device;

a bandwidth size supported by the terminal device;

whether the terminal device accepts a service in a network of an operator subscribed by the terminal device; and number of transmit antennas and/or number of receive antennas supported by the terminal device.

4. The method of claim 1, wherein in the second correspondence, when a value of the S-TMSI modulo M ranges from 0 to ((M/n)−1), the S-TMSI corresponds to a first set of paging-search-space information in the n sets of paging-search-space information;

when the value of the S-TMSI modulo divided by M ranges from (M/n) to ((2M/n)−1), the S-TMSI corresponds to a second set of paging-search-space information in the n sets of paging-search-space information;

when the value of the S-TMSI modulo divided by M ranges from ((n−1)M/n) to (M−1), the S-TMSI corresponds to an n-th set of paging-search-space information in the n sets of paging-search-space information;

wherein n and M are both positive integers, n≥1, and M≥2.

5. The method of claim 1, wherein the third correspondence is the correspondence between S-TMSIs and paging-search-space information, and in the third correspondence, when a value of the S-TMSI modulo M ranges from 0 to ((M/n)−1), the S-TMSI corresponds to a first set of paging-search-space information in the m sets of paging-search-space information;

when the value of the S-TMSI modulo M ranges from (M/n) to ((2M/n)−1), the S-TMSI corresponds to a second set of paging-search-space information in the m sets of paging-search-space information;

when the value of the S-TMSI modulo M ranges from ((n−1)M/n) to (M−1), the S-TMSI corresponds to an m-th set of paging-search-space information in the m set of paging-search-space information;

wherein m and M are both positive integers, m≥1, and M≥2.

6. The method of claim 1, wherein the third correspondence is the correspondence between terminal-device type identities and paging-search-space information, and in the third correspondence, one terminal-device type identity corresponds to one paging-search-space information, or a plurality of terminal-device type identities correspond to one paging-search-space information.

7. The method of claim 1, wherein m=1, and the method further comprises:

determining, by the terminal device, a time-domain location of the target PO according to the paging-search-space information, the paging-common-parameter information, SFN information, and an S-TMSI; and determining, by the terminal device, a frequency-domain location of the target PO according to the frequency-domain information corresponding to the paging-search-space information, the PO frequency-division number W, and the S-TMSI.

8. The method of claim 1, wherein the PO frequency-division number W is configured at a cell granularity or a search space granularity.

9. The method of claim 1, wherein in the first configuration information, frequency-domain information corresponding to paging-search-space information is configured at a cell granularity or a search space granularity.

10. The method of claim 1, further comprising:

receiving, by the terminal device, a first indication, wherein the first indication indicates whether the terminal device determines the time-frequency-domain location of the target PO according to the first configuration information.

11. A method for wireless communication, comprising:

transmitting, by a network device, first configuration information to a terminal device, the first configuration information being used for the terminal device to determine a time-frequency-domain location of a target paging occasion (PO);

wherein either:

(a) the first configuration information comprises at least one of:

a terminal-device type identity, wherein the terminal device type identity is a logical identity intended to group a large number of terminal devices, and terminal devices in different groups use different paging-search-space at least one set of paging-search-space information;

paging-common-parameter information, wherein the paging-common-parameter information comprises at least one of: an offset of a paging frame (PF), a paging cycle T, number of PFs per paging cycle, or number of POs associated with a PF; or frequency-domain information corresponding to the at least one set of paging-search-space information, wherein the first configuration information further comprises a first correspondence, wherein the first correspondence comprises a correspondence between terminal-device type identities and paging-search-space information, wherein the first correspondence is used by the terminal device to determine, according to the terminal-device type identity of the terminal device, first paging-search-space information from the at least one set of paging-search-space information, wherein the first paging-search-space information, the paging-common-parameter information, system frame number (SFN) information, and a serving-temporary mobile subscriber identity (S-TMSI) are used by the terminal device to determine a time-domain location of the target PO, and wherein frequency-domain information corresponding to the first paging-search-space information is used by the terminal device to determine a frequency-domain location of the target PO; or (b) the first configuration information comprises at least one of:

n sets of paging-search-space information, the paging-common-parameter information, or frequency-domain information corresponding to the n sets of paging-search-space information, wherein n is a positive integer, and n≥1, wherein the first configuration information further comprises a second correspondence, wherein the second correspondence comprises a correspondence between S-TMSIs and paging-search-space information, wherein the second correspondence is used by the terminal device to determine, according to the S-TMSI for the terminal device, second paging-search-space information from the n sets of paging-search-space information, wherein the second paging-search-space information, the paging-common-parameter information, the SFN information, and the S-TMSI are used by the terminal device to determine the time-domain location of the target PO, and wherein the frequency-domain information corresponding to the second paging-search-space information is used by the terminal device to determine the frequency-domain location of the target PO; or (c) the first configuration information comprises at least one of:

m sets of paging-search-space information, the paging-common-parameter information, a PO frequency-division number W, or frequency-domain information corresponding to the m sets of paging-search-space information, wherein m and W are both positive integers, m≥1, and W≥1, wherein the first configuration information further comprises a third correspondence, wherein the third correspondence comprises a correspondence between S-TMSIs and paging-search-space information or a correspondence between terminal-device type identities and paging-search-space information, wherein, in the case where m≥1, the third correspondence is used by the terminal device to determine, according to the S-TMSI for the terminal device or the terminal-device type identity of the terminal device, third paging-search-space information from the m sets of paging-search-space information;

the third paging-search-space information, the paging-common-parameter information, the SFN information, and the S-TMSI are used by the terminal device to determine the time-domain location of the target PO, and frequency-domain information corresponding to the third paging-search-space information, the PO frequency-division number W, and the S-TMSI are used by the terminal device to determine the frequency-domain location of the target PQ.

12. A network device, comprising:

a processor; and a memory storing a computer program which, when executed by the processor, causes the network device to perform the method of claim 11.

13. A terminal device, comprising:

a processor; and a memory storing a computer program which, when executed by the processor, causes the terminal device to:

receive first configuration information from a network device, the first configuration information being used for the terminal device to determine a time-frequency-domain location of a target paging occasion (PO);

wherein either:

(a) the first configuration information comprises at least one of:

a terminal-device type identity, wherein the terminal device type identity is a logical identity intended to group a large number of terminal devices, and terminal devices in different groups use different paging-search-space configurations;

at least one set of paging-search-space information;

paging-common-parameter information, wherein the paging-common-parameter information comprises at least one of: an offset of a paging frame (PF), a paging cycle T, number of PFs per paging cycle, or number of POs associated with a PF; or frequency-domain information corresponding to the at least one set of paging-search-space information, wherein the computer program is executed by the processor to further cause the terminal device to:

determine first paging-search-space information from the at least one set of paging-search-space information according to the terminal-device type identity of the terminal device and a first correspondence, wherein the first correspondence comprises a correspondence between terminal-device type identities and paging-search-space information;

determine a time-domain location of the target PO according to the first paging-search-space information, the paging-common-parameter information, system frame number (SFN) information, and a serving-temporary mobile subscriber identity (S-TMSI); and determine a frequency-domain location of the target PO according to frequency-domain information corresponding to the first paging-search-space information; or (b) the first configuration information comprises at least one of:

n sets of paging-search-space information, the paging-common-parameter information, or frequency-domain information corresponding to the n sets of paging-search-space information, wherein n is a positive integer, and n≥1, wherein the computer program is executed by the processor to further cause the terminal device to:

determine second paging-search-space information from the n sets of paging-search-space information according to the S-TMSI for the terminal device and a second correspondence, wherein the second correspondence comprises a correspondence between S-TMSIs and paging-search-space information;

determine the time-domain location of the target PO according to the second paging-search-space information, the paging-common-parameter information, the SFN information, and the S-TMSI; and determine the frequency-domain location of the target PO according to frequency-domain information corresponding to the second paging-search-space information; or (c) the first configuration information comprises at least one of:

m sets of paging-search-space information, the paging-common-parameter information, a PO frequency-division number W, or frequency-domain information corresponding to the m sets of paging-search-space information, wherein m and W are both positive integers, m≥1, and W≥1, wherein the computer program is executed by the processor to further cause the terminal device to: in the case where m≥1, determine third paging-search-space information from the m sets of paging-search-space information according to the S-TMSI for the terminal device or the terminal-device type identity of the terminal device, and a third correspondence, wherein the third correspondence comprises a correspondence between S-TMSIs and paging-search-space information or a correspondence between terminal-device type identities and paging-search-space information;

determine the time-domain location of the target PO according to the third paging-search-space information, the paging-common-parameter information, the SFN information, and the S-TMSI; and determine the frequency-domain location of the target PO according to frequency-domain information corresponding to the third paging-search-space information, the PO frequency-division number W, and the S-TMSI.

14. The terminal device of claim 13, wherein in the first correspondence, one terminal-device type identity corresponds to one paging-search-space information, or a plurality of terminal-device type identities correspond to one paging-search-space information.

15. The terminal device of claim 13, wherein a terminal-device type is classified according to at least one of:

a maximum transmit power level supported by the terminal device;

an application scenario supported by the terminal device;

a bandwidth size supported by the terminal device;

whether the terminal device accepts a service in a network of an operator subscribed by the terminal device; and number of transmit antennas and/or number of receive antennas supported by the terminal device.

16. The terminal device of claim 13, wherein in the second correspondence, when a value of the S-TMSI modulo M ranges from 0 to ((M/n)−1), the S-TMSI corresponds to a first set of paging-search-space information in the n sets of paging-search-space information;

when the value of the S-TMSI modulo M ranges from (M/n) to ((2M/n)−1), the S-TMSI corresponds to a second set of paging-search-space information in the n sets of paging-search-space information;

when the value of the S-TMSI modulo M ranges from ((n−1)M/n) to (M−1), the S-TMSI corresponds to an n-th set of paging-search-space information in the n sets of paging-search-space information;

wherein n and M are both positive integers, n≥1, and M≥2.

17. The terminal device of claim 13, wherein the third correspondence is the correspondence between S-TMSIs and paging-search-space information, and in the third correspondence, when a value of the S-TMSI modulo M ranges from 0 to ((M/n)−1), the S-TMSI corresponds to a first set of paging-search-space information in the m sets of paging-search-space information;

when the value of the S-TMSI modulo M ranges from (M/n) to ((2M/n)−1), the S-TMSI corresponds to a second set of paging-search-space information in the m sets of paging-search-space information;

when the value of the S-TMSI modulo M ranges from ((n−1)M/n) to (M−1), the S-TMSI corresponds to an m-th set of paging-search-space information in the m set of paging-search-space information;

wherein m and M are both positive integers, m≥1, and M≥2.

18. The terminal device of claim 13, wherein the third correspondence is the correspondence between terminal-device type identities and paging-search-space information, and in the third correspondence, one terminal-device type identity corresponds to one paging-search-space information, or a plurality of terminal-device type identities correspond to one paging-search-space information.

19. The terminal device of claim 13, wherein the computer program is executed by the processor to further cause the terminal device to: in the case where m=1, determine a time-domain location of the target PO according to the paging-search-space information, the paging-common-parameter information, SFN information, and an S-TMSI; and determine a frequency-domain location of the target PO according to the frequency-domain information corresponding to the paging-search-space information, the PO frequency-division number W, and the S-TMSI.

20. The terminal device of claim 13, wherein the PO frequency-division number W is configured at a cell granularity or a search space granularity.

* * * * *